Aug. 14, 1951   T. H. WIANCKO   2,563,899
PRESSURE RESPONSIVE DEVICE
Filed May 31, 1947
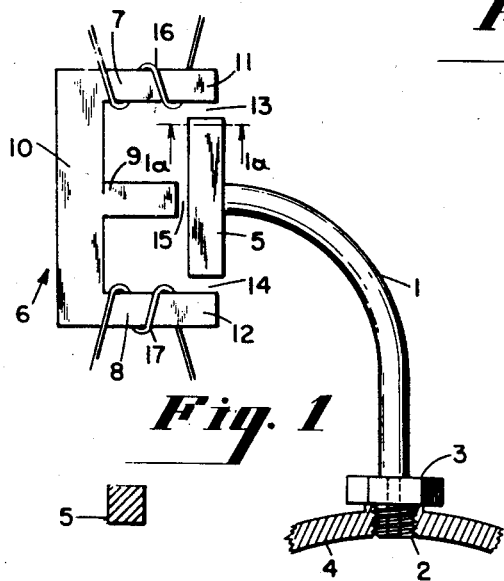
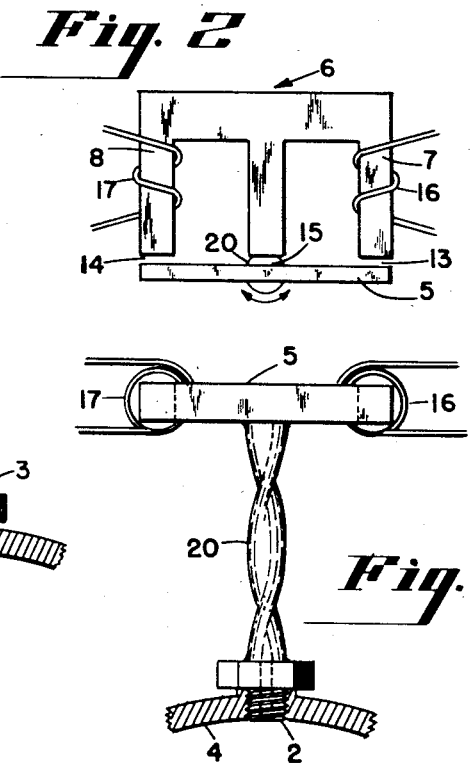
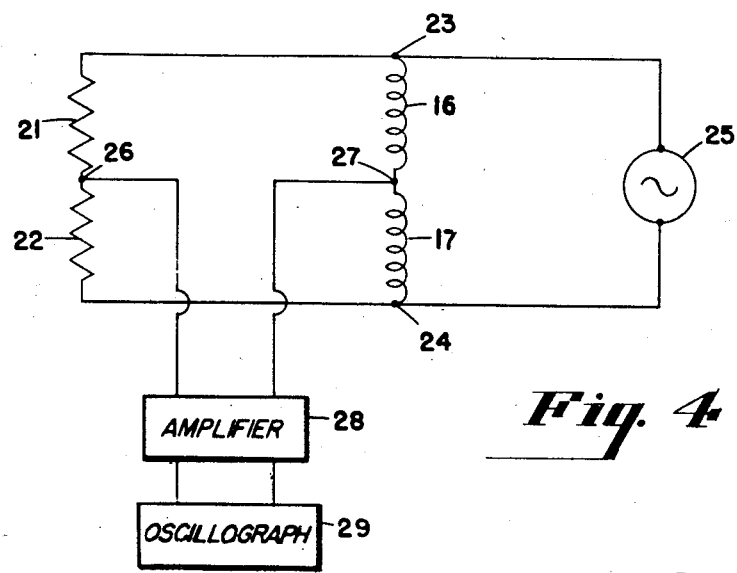
INVENTOR.
THOMAS H. WIANCKO
BY
Christie & Angus
ATTORNEYS Patented Aug. 14, 1951

2,563,899

UNITED STATES PATENT OFFICE 2,563,899

PRESSURE RESPONSIVE DEVICE

Thomas H. Wiancko, Altadena, Calif., assignor to Aerojet Engineering Corporation, Azusa, Calif., a corporation of Delaware Application May 31, 1947, Serial No. 751,541

3 Claims. (Cl. 171—119)

This invention relates to pressure pickup devices and more particularly to pickup devices of this character adapted to respond to and give indications of the pressure or changes of pressure in a chamber or device.

The principal object of the invention is to provide a relatively simple pickup device of this character which will respond to pressures with a reasonable degree of accuracy and be able to withstand considerable variations of pressure and temperature.

The pickup device according to my invention is particularly applicable to the measurement of pressure in such places as the chambers of motors such as rocket motors, jet propulsion motors and the like, although it is not necessarily limited to use with such devices. Combustion motors such as rocket motors and jet propulsion motors often operate under high temperatures and with considerable variations in pressure and it is desired that a suitable pressure pickup device for use with them shall be able to perform its function adequately in spite of such extremes of pressure and temperature.

In accordance with my invention, I provide a pickup device embodying a Bourdon tube in communication with the chamber or device whose pressure is to be measured, and having attached to it a mass of magnetic material forming part of the magnetic circuit of a magnetic core, in relation to which I provide coils. Change of pressure within the tube will produce movement of the Bourdon tube and thereby move the magnetic mass relative to the rest of the magnetic circuit and produce a corresponding effect on the coils.

Such a change of the magnetic circuit through the coils will produce electrical changes; and when the pickup is connected in a suitable circuit the changes can be manifested on a suitable indicator. For example, the coils may be connected as arms of a bridge circuit and the variations or unbalance of the bridge due to changes of the pressure may be measured at the bridge output in a well known manner.

The foregoing and other features of the invention will be better understood from the following detailed description and from the accompanying drawing of which:

Fig. 1 illustrates a pickup device in accordance with my invention;

Fig. 1a is a cross section view showing a detail of Fig. 1;

Fig. 2 illustrates a top view of a modification of a pickup device according to my invention;

Fig. 3 shows an elevation view of the device of Fig. 2; and

Fig. 4 illustrates a bridge circuit in which the coils of the pickup may be connected.

The pressure pickup device according to my invention, comprises a bent tube 1 of the Bourdon tube type. The Bourdon tube terminates at its lower end in a threaded portion 2 having a nut member 3 so that the tube may be threaded into the threaded opening of a chamber 4, of which a portion is shown in cross section; and the lower end of the tube thus opens into the chamber so as to receive the chamber pressure. The outer end of the tube 1 is closed and has attached to it, for example, by welding or otherwise, a mass 5 of a magnetic material, ordinarily iron. The member 5 may be in the form of a square or rectangular prism as indicated by Fig. 1a which is a cross section view taken at the line 1a—1a of Fig. 1.

The member 5 forms part of the magnetic circuit of a core member 6 which, for example, may be an iron core having an upper leg 7, a lower leg 8, a middle leg 9 and a main leg 10. The Bourdon tube 1 is placed in relation to the core 6 so that the magnetic member 5 has its long axis aligned between the respective poles 11 and 12 of legs 7 and 8, leaving small air gaps 13 and 14 respectively, between the ends of member 5 and the poles, and leaving a small air gap 15 between the end of leg 9 and the inner side of member 5.

By this arrangement, the member 5 forms with the core member 6 a substantially continuous magnetic circuit through the air gaps; one magnetic circuit passing through the upper leg 7 and the middle leg 9 and the other magnetic circuit passing through the lower leg 8 and the middle leg 9. A coil 16 is placed around the upper leg 7 and another similar coil 17 is placed around the lower leg 8.

Assuming that the device 4 is a closed chamber having variations of pressure within it, this pressure will be transmitted from the chamber through the Bourdon tube 1, and the changes in pressure correspondingly vary the bend of the Bourdon tube and consequently the portion of member 5 in the magnetic circuit and the width of air gaps 13 and 14. When the pressure causes the Bourdon tube to become straighter, the bar 5 moves upward, and air gap 13 becomes smaller while air gap 14 becomes correspondingly larger; and when a change of pressure allows the tube to become more bent, the member 5 is moved downward causing gap 14 to become smaller and gap 13 to become correspondingly larger.

In Fig. 2 I show a modification of my pressure pickup which is substantially the same as I have shown in Fig. 1; and the parts of Fig. 2 which are the same as in Fig. 1 are similarly numbered. The principal difference in the construction of Fig. 2 from that of Fig. 1 resides in the particular form of the Bourdon tube and the position of bar 5. Instead of using a curved tube as shown in Fig. 1 I use a twisted tube 20 in the embodiment of Fig. 2; and the tube preferably has a substantially oval or elliptical or rectangular cross section, as shown. Otherwise, the arrangement of the Bourdon tube is the same as in Fig. 1; and the magnetic member 5 is attached at the upper or closed end of the tube in the same way as in Fig. 1; and the lower end of the tube is in communication with the inside of chamber 4 through the threading portion 2, the same as in Fig. 1. The bar 5 is placed so that it is juxtaposed near the ends of legs 7 and 8; so that when the Bourdon tube twists, or untwists, the bar undergoes a rotary movement about the axis of the tube, thereby making one gap 13 smaller while making the other gap 14 larger, or vice versa.

The operation of the arrangement of Fig. 2 is quite similar to that of Fig. 1, the principal difference being that in the construction of Fig. 2, an increase of pressure within the chamber transmitted through the Bourdon tube tends to untwist the tube and thereby provide the twisting or rotary motion of the member 5.

In the case of the embodiments of both Fig. 1 and Fig. 2 the air gaps 13 and 14 are altered by changes of pressure, thereby altering the reluctance of the magnetic path through the respective legs 7 and 8 of the core and thereby correspondingly affecting the two coils 16 and 17. The reluctance of the two legs changes differentially, owing to the differential changes of the air gaps 13 and 14; and while the reluctance of the magnetic path through one leg increases the reluctance of the other correspondingly decreases.

The effect of the change of the air gaps in sponse to the changes in pressure in the chamber may be indicated or manifested by some suitable indicating means. A typical form of indicating circuit which I may use for this purpose is shown in Fig. 4 wherein the coils numbered 16 and 17 correspond to the same numbered coils in Figs. 1 and 2. This is a bridge arrangement in which the coils 16 and 17 are connected in series with equal resistors 21 and 22. The one pair of opposite bridge terminals 23 and 24 of the bridge have connected across them a suitable source of alternating or oscillating voltage such as an oscillator 25. The conjugate pair of opposite bridge terminals 26 and 27 are the output terminals. These are connected to an amplifier 28 and the output of the amplifier is connected to a suitable indicating instrument such as a voltage indicator or an oscillograph 29 which can make a continuous graphical record representing degree of bridge unbalance.

To operate such a bridge structure, the bridge may be placed in a condition of balance; and this may conveniently be done by making coils 16 and 17 equal so that with equal air gaps 13 and 14 the coils 16 and 17 will be of equal impedance. In such case resistors 21 and 22 should be of equal value and this will serve to produce the unbalanced bridge condition in which no output will be supplied to the amplifier or oscillograph from the oscillating source 25. But when a change of pressure occurs the member 5 will be correspondingly moved thereby varying the reactances of coils 16 and 17 in opposite directions and producing a corresponding unbalance of the bridge which will be manifested by an output supplied to amplifier 28 and the consequent record at the oscillograph 29.

Although a particular form of a responsive circuit has been shown in Fig. 4 it will be understood that other forms of responsive circuits may be used for connection with the pickup to give an indication responsive to the pressure.

Modifications of the construction may readily suggest themselves to those skilled in the art. For example, the shape or cross section of the Bourdon tube may be modified without changing its operation. Or again, the core might be modified; for example if the middle leg 9 be made of a permanent magnet such as steel so as to polarize the magnetic circuit, the pickup may be made to respond to the rate of change of the pressure instead of directly in proportion to the pressure as would be the case when the core does not contain a permanent magnet.

The pickup device according to my invention is simple in construction and not substantially affected by high temperature, and is able to function over wide ranges and variations of temperature and pressure.

An important advantage of the pickup according to my invention is that its accuracy is substantially unaffected by acceleration or vibration or temperature-induced distortions. The reason for this is that all such variations or distortions tend to affect both the air gaps 13 and 14 to the same extent. Since the operation depends on the differences of these air gaps rather than on their absolute dimensions, it will not produce substantial errors if they both should happen to become smaller or larger to the same extent; and a change of size of air gap 15 would not be of great consequence either, since it is common to the magnetic circuits of the two end legs.

I claim:

1. A pressure pickup device comprising a core of magnetic material, said core having two opposite legs, a coil wound around each of said opposite legs, and a third leg carrying the magnetic circuit of said two opposite legs, a bar of magnetic material extending between said two opposite legs and located close to the third leg, the arrangement being such that the bar closes the magnetic circuit through each of the opposite legs to the third leg, a twisted Bourdon tube supporting said bar and holding it in position, the open end of said tube being adapted to be placed in communication with a chamber whose pressure is to be measured.

2. A pressure pickup device comprising a core of magnetic material forming a partially closed circuit, a coil on said core, an adjustable bar of magnetic material closing the magnetic circuit through said core and through air gaps between ends of the core and the respective ends of the bar, said adjustable bar being attached to a Bourdon tube, one end of which is in communication with the source of pressure to be measured, the axis of the Bourdon tube at the point of its attachment to the bar being substantially perpendicular to the axis of the bar, said Bourdon tube being a twisted tube and the degree of twist of which varies with changes of pressure of said source.

3. A pressure pickup device comprising an E- shaped core of magnetic material having two outer legs and a middle leg, a coil wound around each of the outer legs, a bar of magnetic material extending between the two outer legs and close to the inner leg with air gaps between the bar and the two outer legs, said bars being attached to the closed end of a Bourdon tube, the open end of which is adapted to be placed in communication with a chamber whose pressure is to be measured. the axis of the Bourdon tube at the point of its attachment to the bar being substantially perpendicular to said bar, and the Bourdon tube being a twisted tube, whereby changes of pressure rotate the bar, said bar being juxtaposed opposite the ends of the outer legs, whereby changes of pressure operate to twist the Bourdon tube and thereby rotate the bar to differentially vary the two air gaps.

THOMAS H. WIANCKO.

REFERENCES CITED

The following references are of record in the file of this patent:

UNITED STATES PATENTS

| Number | Name | Date |
| --- | --- | --- |
| 1,156,862 | Sibley | Oct. 12, 1915 |
| 2,224,709 | Uehling | Dec. 10, 1940 |
| 2,260,837 | Kuehni | Oct. 28, 1941 |
| 2,398,666 | Reason | Apr. 16, 1946 |
| 2,408,524 | Mestas | Oct. 1, 1946 |
| 2,430,757 | Conrad et al. | Nov. 11, 1947 |

FOREIGN PATENTS

| Number | Country | Date |
| --- | --- | --- |
| 398,234 | France | Mar. 17, 1908 |